US012763719B2

(12) United States Patent
Morankar et al.

(10) Patent No.: US 12,763,719 B2
(45) Date of Patent: Oct. 13, 2026

(54) RAPID CLAMPING SYSTEMS FOR SOLAR TRACKERS

(71) Applicant: Nextpower LLC, Fremont, CA (US)

(72) Inventors: Jitendra Morankar, Hyderabad (IN); Abhimanyu Sable, Hyderabad (IN); Raghavendra Praveen Maddulapalli, Vijayawada (IN)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/967,845

(22) Filed: Dec. 4, 2024

(65) Prior Publication Data

US 2025/0096726 A1 Mar. 20, 2025

Related U.S. Application Data

(62) Division of application No. 18/093,590, filed on Jan. 5, 2023, now Pat. No. 12,191,802.

(Continued)

(51) Int. Cl.
*H02S 30/00* (2014.01)
*F16B 2/06* (2006.01)

(Continued)

(52) U.S. Cl.
CPC ................ *H02S 30/10* (2014.12); *F16B 2/06* (2013.01); *F16M 13/02* (2013.01); *H02S 20/32* (2014.12)

(58) Field of Classification Search
CPC .......... H02S 30/10; H02S 20/32; H02S 30/00; F16B 2/06; F16B 2/08; F16B 7/0493; F16M 13/02; F24S 2025/6001; F24S 2025/6003; F24S 25/65; F24S 30/425; Y02E 10/47; Y02E 10/50
See application file for complete search history.

(56) References Cited

U.S. PATENT DOCUMENTS 5,253,965 A 10/1993 Angel
5,490,651 A 2/1996 Kump
(Continued)

FOREIGN PATENT DOCUMENTS

AU 2020373193 A1 4/2022
CN 209218014 U 8/2019
(Continued)

OTHER PUBLICATIONS

PCT Search Report and Written Opinion issued in PCT Application No. PCT/2023/010206 dated Apr. 6, 2023.
(Continued)

*Primary Examiner* — Amy J. Sterling
(74) *Attorney, Agent, or Firm* — Fredrikson & Byron, P.A.

(57) ABSTRACT

A coupling system for use with a solar tracker includes a support rail defining a channel for receipt of a solar module therein, the support rail including an aperture defined therein that is in open communication with the channel and a clamp assembly selectively coupled to the support rail, a first portion of the clamp assembly configured to receive a portion of a torque tube therein and a second portion of the clamp assembly configured to selectively extend through the aperture of the support rail when the clamp assembly is transitioned from a first, unlocked position, to a second, locked position.

15 Claims, 10 Drawing Sheets

Related U.S. Application Data

(60) Provisional application No. 63/296,669, filed on Jan. 5, 2022.

(51) Int. Cl.
*F16M 13/02* (2006.01)
*H02S 20/32* (2014.01)
*H02S 30/10* (2014.01)

(56) References Cited

U.S. PATENT DOCUMENTS

| | | | | |
|---|---|---|---|---|
| 5,850,674 | A | 12/1998 | Jansen | |
| 6,076,235 | A | 6/2000 | Khokhar | |
| 6,510,717 | B1 | 1/2003 | Levi | |
| 6,622,976 | B1 | 9/2003 | Ianello | |
| 6,647,596 | B1 | 11/2003 | Caveney | |
| 6,905,299 | B2 | 6/2005 | Moores, Jr. | |
| 7,121,122 | B2 | 10/2006 | Levi | |
| 7,669,293 | B2 | 3/2010 | Huang | |
| 7,763,835 | B2 | 7/2010 | Romeo | |
| 8,540,194 | B2 | 9/2013 | Azuma et al. | |
| 8,549,810 | B1 | 10/2013 | Norton et al. | |
| 8,622,347 | B2 | 1/2014 | Oyzerskiy | |
| 8,757,560 | B2 | 6/2014 | Darnell | |
| 8,939,648 | B2 | 1/2015 | Schneider et al. | |
| 9,206,999 | B2 | 12/2015 | Reed et al. | |
| 9,249,994 | B2 | 2/2016 | Zuritis | |
| 9,254,949 | B2 | 2/2016 | Dinh et al. | |
| 9,276,521 | B2 | 3/2016 | Reed et al. | |
| 9,303,792 | B2 | 4/2016 | Heims et al. | |
| 9,395,104 | B2 | 7/2016 | Grushkowitz | |
| 9,647,433 | B2 | 5/2017 | Meine et al. | |
| 9,845,824 | B2 | 12/2017 | Lamb et al. | |
| 9,923,510 | B2 | 3/2018 | Au | |
| 10,093,465 | B2 | 10/2018 | Rufty et al. | |
| 10,100,861 | B2 | 10/2018 | Zhang | |
| 10,443,895 | B1 | 10/2019 | Cherukupalli et al. | |
| 10,487,907 | B1 | 11/2019 | Mohamed et al. | |
| 10,536,109 | B2 | 1/2020 | Corio | |
| 10,622,937 | B2 | 4/2020 | Pesce et al. | |
| 10,720,877 | B2 | 7/2020 | Haas et al. | |
| 10,742,160 | B2 | 8/2020 | Kobayashi | |
| 10,845,092 | B2 | 11/2020 | Dally | |
| 10,917,039 | B2 | 2/2021 | Corio | |
| 10,931,224 | B2 | 2/2021 | Praca et al. | |
| 11,035,591 | B2 | 6/2021 | Childress | |
| 11,271,518 | B2 | 3/2022 | Ballentine et al. | |
| 11,515,832 | B2 | 11/2022 | Taha et al. | |
| 11,522,352 | B1 | 12/2022 | Shell | |
| 11,525,604 | B1 | 12/2022 | Delgado-Nanez et al. | |
| 11,563,402 | B2 | 1/2023 | Corio | |
| 11,808,399 | B2 | 11/2023 | Vilhelmsen | |
| 11,929,708 | B2 | 3/2024 | Mcpheeters et al. | |
| 11,962,269 | B2 * | 4/2024 | Creasy | B21D 5/06 |
| 12,009,777 | B2 | 6/2024 | Jacobs | |
| 2003/0204936 | A1 | 11/2003 | Caveney | |
| 2005/0093764 | A1 | 5/2005 | Nugnes et al. | |
| 2008/0308094 | A1 | 12/2008 | Johnston | |
| 2010/0229350 | A1 | 9/2010 | Kostal et al. | |
| 2011/0073718 | A1 | 3/2011 | Whipple et al. | |
| 2011/0100434 | A1 | 5/2011 | Van Walraven | |
| 2011/0138585 | A1 | 6/2011 | Kmita et al. | |
| 2012/0124783 | A1 | 5/2012 | Deberry et al. | |
| 2012/0192925 | A1 | 8/2012 | Grushkowitz et al. | |
| 2012/0279018 | A1 | 11/2012 | Deberry et al. | |
| 2013/0039610 | A1 | 2/2013 | Schneider et al. | |
| 2013/0192157 | A1 | 8/2013 | Coyle | |
| 2013/0333164 | A1 | 12/2013 | Dinh et al. | |
| 2013/0341934 | A1 | 12/2013 | Kawanishi | |
| 2014/0090637 | A1 | 4/2014 | Grushkowitz | |
| 2014/0237772 | A1 | 8/2014 | Crouse | |
| 2014/0246549 | A1 | 9/2014 | West et al. | |
| 2014/0259566 | A1 | 9/2014 | Rouleau et al. | |
| 2014/0263902 | A1 | 9/2014 | Conley et al. | |
| 2014/0325796 | A1 | 11/2014 | Mayo et al. | |
| 2015/0059826 | A1 | 3/2015 | Reed et al. | |
| 2015/0059827 | A1 | 3/2015 | Reed et al. | |
| 2015/0090316 | A1 | 4/2015 | Song et al. | |
| 2015/0144751 | A1 | 5/2015 | Schneider et al. | |
| 2015/0200621 | A1 * | 7/2015 | Reed | F24S 25/636 29/525.01 |
| 2015/0288326 | A1 | 10/2015 | Au | |
| 2017/0040931 | A1 | 2/2017 | Schuit et al. | |
| 2017/0294870 | A1 | 10/2017 | Almy et al. | |
| 2017/0319319 | A1 | 11/2017 | Fischer | |
| 2017/0359017 | A1 | 12/2017 | Corio | |
| 2018/0062568 | A1 * | 3/2018 | Schulte | F24S 25/65 |
| 2020/0076360 | A1 * | 3/2020 | Watson | F24S 25/70 |
| 2020/0153382 | A1 | 5/2020 | Ballentine et al. | |
| 2020/0304057 | A1 | 9/2020 | Suan et al. | |
| 2020/0382049 | A1 | 12/2020 | Wares et al. | |
| 2021/0180832 | A1 | 6/2021 | Schuknecht et al. | |
| 2021/0249986 | A1 | 8/2021 | Von Deylen | |
| 2021/0351738 | A1 | 11/2021 | Schuknecht et al. | |
| 2021/0359640 | A1 | 11/2021 | Schuknecht et al. | |
| 2021/0396255 | A1 | 12/2021 | Watson et al. | |
| 2022/0294386 | A1 | 9/2022 | Creasy et al. | |
| 2023/0128834 | A1 | 4/2023 | Delgado-Nanez | |
| 2023/0396208 | A1 | 12/2023 | Pedlar et al. | |
| 2023/0402963 | A1 | 12/2023 | Yadlapalli et al. | |
| 2024/0372506 | A1 | 11/2024 | Delgado-Nanez et al. | |

FOREIGN PATENT DOCUMENTS

| | | | |
|---|---|---|---|
| CN | 113841332 | A | 12/2021 |
| WO | 2022056487 | A1 | 3/2022 |

OTHER PUBLICATIONS

European Patent Office, “Extended European Search Report” , From Application No. 23737587.8, Dated Jun. 3, 2026, pp. 7.

* cited by examiner

RAPID CLAMPING SYSTEMS FOR SOLAR TRACKERS

CROSS-REFERENCE TO RELATED APPLICATIONS

This application is a divisional of U.S. patent application Ser. No. 18/093,590, filed Jan. 5, 2023, which claims the benefit of and priority to U.S. Patent Application Ser. No. 63/296,669, filed Jan. 5, 2022, the disclosures of the above-identified applications are hereby incorporated by reference in their respective entireties.

BACKGROUND

Technical Field

The present disclosure relates to solar power generation systems, and more particularly, to clamps and clamping systems for securing solar modules to a support structure.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Coupling the numerous solar modules to the support structure requires a significant number of clamps or other mechanisms, each requiring a significant number of fasteners, driving up the cost of manufacturing each mechanism. As can be appreciated, assembling each of these mechanisms and securely tightening each fastener requires an enormous amount of time, contributing to increased cost and longer assembly time. The present disclosure seeks to address the shortcomings of prior tracker systems.

SUMMARY

In accordance with an aspect of the present disclosure, a coupling system for use with a solar tracker includes a support rail defining a channel for receipt of a solar module therein, the support rail including an aperture defined therein that is in open communication with the channel and a clamp assembly selectively coupled to the support rail, a first portion of the clamp assembly configured to receive a portion of a torque tube therein, a second portion of the clamp assembly configured to selectively extend through the aperture of the support rail when the clamp assembly is transitioned from a first, unlocked position, to a second, locked position.

In aspects, when the clamp assembly is placed in the second, locked position, the second portion of the clamp assembly may be configured to extend through the aperture of the support rail and abut a portion of a solar module disposed within the channel to selectively secure the solar module within the channel.

In other aspects, the coupling system may include at least one pin for selectively coupling a portion of the clamp assembly to the support rail.

In certain aspects, the at least one pin may be received within a bore defined through a portion of the support rail.

In aspects, the at least one pin may be received within a slot defined through a portion of the support rail, the slot oriented at an angle relative to a longitudinal axis defined through the support rail.

In certain aspects, the coupling system may include a fastener assembly, the fastener assembly selectively coupled to a portion of the clamp assembly and configured to cause the clamp assembly to transition from the first, unlocked position, to the second, locked position.

In aspects, the clamp assembly may include at least one protuberance disposed thereon configured to selectively engage a portion of a torque tube received within the first portion of the clamp assembly.

In other aspects, the support rail may include a tab disposed on a portion thereof adjacent the channel, the tab configured to engage a portion of a solar module.

In certain aspects, the tab may be angled towards an interior of the channel.

In accordance with another aspect of the present disclosure, a coupling system for use with a solar tracker includes a support rail defining a channel for receipt of a solar module therein, the support rail including an aperture defined therein that is in open communication with the channel, and a clamp selectively coupled to the support rail, the clamp including a pair of legs disposed in spaced relation to one another and configured to receive a portion of a torque tube therebetween, a portion of the pair of legs configured to selectively extend through the aperture of the support rail when the clamp is transitioned from a first, unlocked position, to a second, locked position, wherein when the pair of legs is placed in the second, locked position, the portion of the pair of legs is configured to extend through the aperture of the support rail and abut a portion of a solar module disposed within the channel to selectively secure the solar module within the channel.

In aspects, the coupling system may include at least one pin for selectively coupling the clamp to the support rail.

In other aspects, the at least one pin may be received within a slot defined through a portion of the support rail.

In certain aspects, the slot may be oriented at an upward angle relative to a longitudinal axis defined through the support rail in a direction towards a center portion of the support rail.

In other aspects, at least one of the pair of legs of the clamp may include a protuberance disposed thereon, the protuberance configured to selectively engage a portion of a torque tube disposed between the pair of legs of the clamp.

In accordance with another aspect of the present disclosure, a coupling system for use with a solar tracker includes a support rail defining a channel for receipt of a solar module therein, the support rail including an aperture defined therein that is in open communication with the channel, and a clamp assembly including a saddle selectively coupled to a portion of the support rail, a portion of the saddle configured to selectively extend through the aperture of the support rail, and a pair of straps selectively coupled to a portion of the saddle and configured to selectively receive a portion of a torque tube therebetween, wherein the pair of straps is configured to transition from a first, unlocked position, to a second, locked position, wherein the pair of straps effectuate extension of the portion of the saddle through the aperture of the support rail to abut a portion of a solar module disposed within the channel to selectively secure the solar module within the channel.

In aspects, the coupling system may include at least one pin for selectively coupling a portion of the saddle to the support rail.

In certain aspects, the at least one pin may be received within a slot defined through a portion of the saddle.

In other aspects, the coupling system may include a fastener assembly operably coupled to a portion of the pair of straps and configured to transition the pair of straps from the first, unlocked position to the second, locked position.

In aspects, the fastener assembly may include a strap bolt operably coupled to a portion of a first strap of the pair of straps and a trunnion operably coupled to a portion of a second strap of the pair of straps and operably coupled to a portion of the strap bolt.

In other aspects, a portion of the saddle may include a protuberance disposed thereon configured to abut a portion of a torque tube interposed between the pair of straps.

BRIEF DESCRIPTION OF THE DRAWINGS

Various aspects and features of the present disclosure are described hereinbelow with reference to the drawings, wherein.

DETAILED DESCRIPTION

Figure 1:
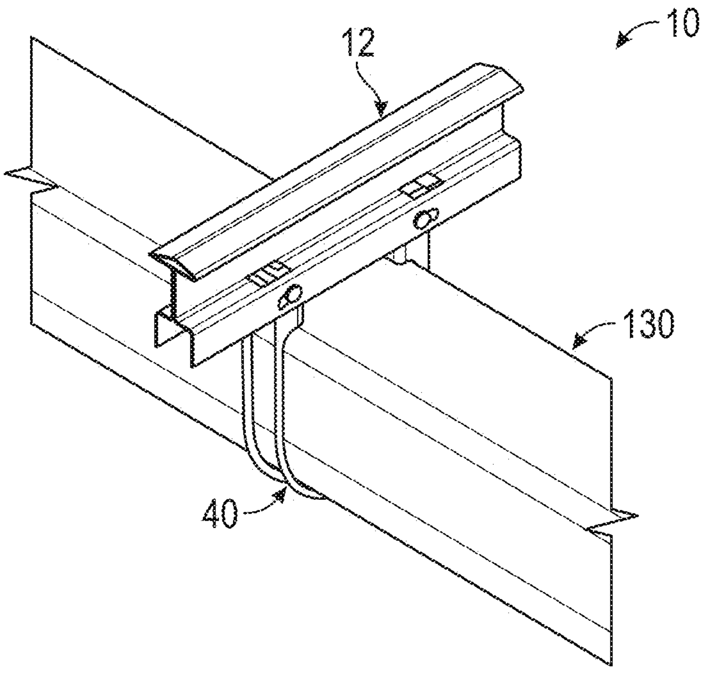
FIG. 1 is a perspective view of a clamp assembly provided in accordance with the present disclosure.
Figure 2:
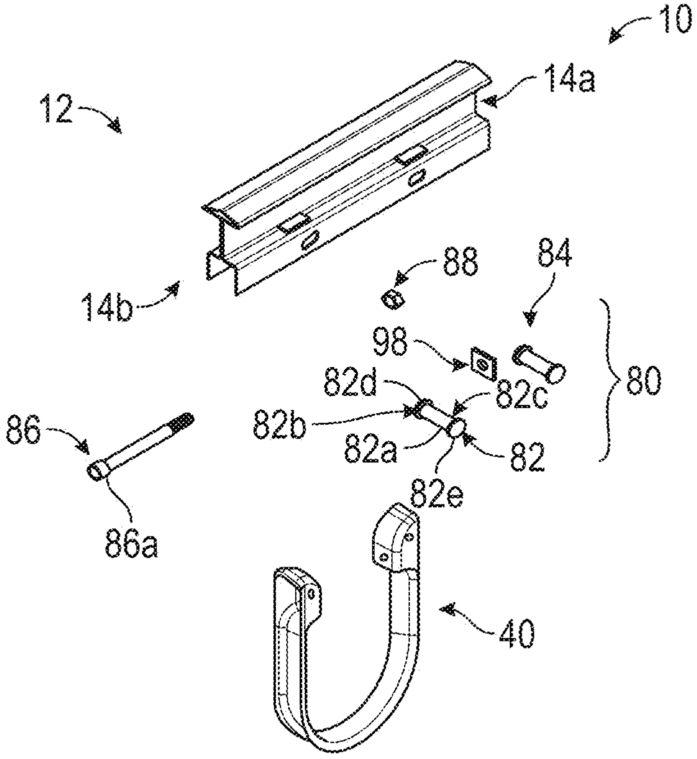
FIG. 2 is an exploded, perspective view, of the clamp assembly of FIG. 1.
Figure 3:
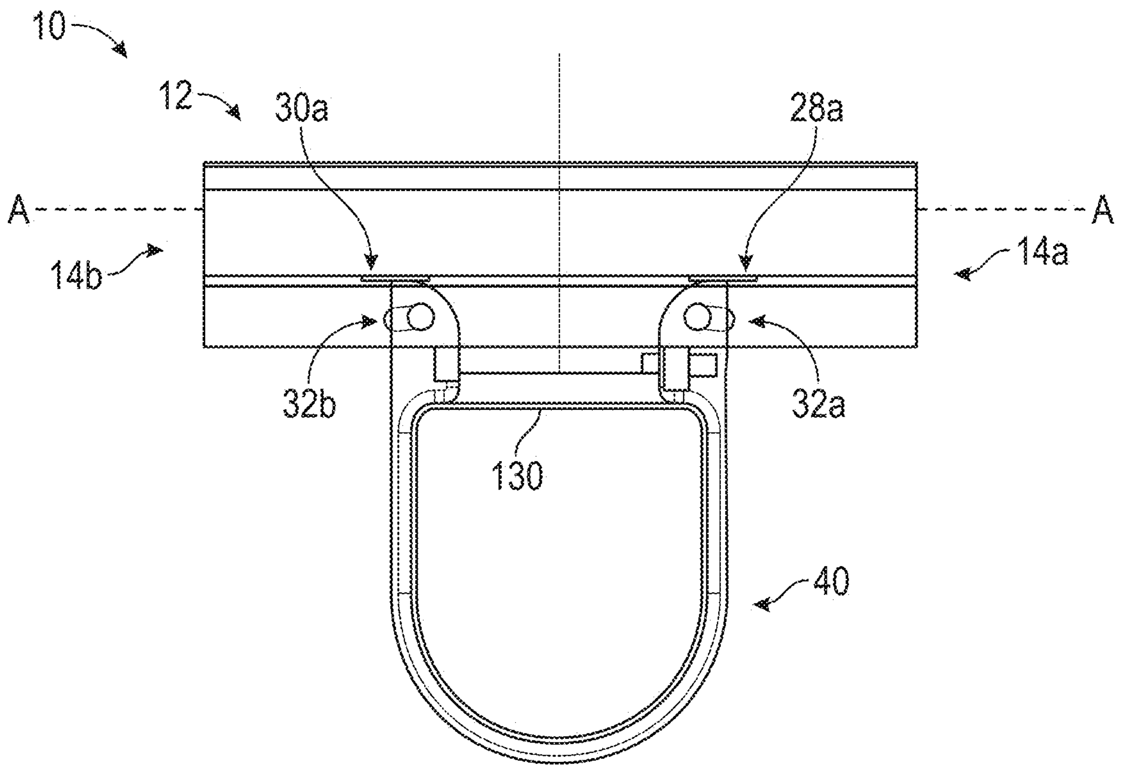
FIG. 3 is an elevation view of the clamp assembly of FIG. 1.

The present disclosure is directed to a coupling system for use with a solar tracker. The coupling system described herein reduces the number of fasteners required to couple solar modules to a torque tube and reduces the amount of labor required to install and/or adjust solar modules on the torque tubes. The coupling system includes a support rail having a generally I-Beam upper portion and a pair of spaced apart flanges disposed on a lower portion thereof and extending therefrom. The upper portion defines a pair of channels disposed in juxtaposed relation, each configured to slidable receive a portion of a respective solar module therein. The pair of spaced apart flanges define a channel therebetween for receipt of a portion of a clamp.

The coupling system includes a clamp defining a generally U-shaped configuration having pair of spaced apart legs coupled to one another by a crown defining a channel therebetween for receipt of a torque tube therein. Each of the pair of legs includes a protuberance disposed on an upper portion that extends towards one another into the channel which narrows or otherwise reduces the width of the channel at the upper portion of the pair of legs. As can be appreciated, an upper portion of each of the pair of protuberances includes an arcuate profile to aid in splaying open or otherwise spreading apart the pair of legs as a torque tube is advanced within the channel. In this manner, once the torque tube is fully received within the channel of the clamp, the pair of protuberances cooperate to inhibit or otherwise make is more difficult to remove the torque tube from the channel.

The arcuate upper portion of the pair of protuberances is received within respective apertures defined through the support rail. In this manner, the apertures enable the arcuate upper portion of the pair of protuberances of the clamp to extend through the channel defined between the pair of flanges of the support rail and into the pair of channels of the upper portion of the support rail. As can be appreciated, when then clamp is disposed in a first, unlocked condition, the pair of legs is disposed in a splayed open or otherwise spread apart configuration where the arcuate upper portion of the pair of protuberances is below, level with, or slightly above a lower surface of the pair of channels of the upper portion of the support rail. By being disposed below, level with, or slightly above the lower surface of the pair of channels, a solar module is permitted to be slide or otherwise translated within one or both of the pair of channels. Once the solar module is located at the desired location, a fastener assembly, including a bolt, nut, and washer, is coupled to the pair of legs of the clamp to draw or otherwise bring the pair of legs of the clamp towards one another. As the pair of legs of the clamp are drawn towards one another by the fastener assembly, the arcuate upper portion of the pair of legs extend through the pair of apertures and further into the pair of channels of the support rail to abut or otherwise contact the solar module disposed therewithin. Continued tightening of the fastener assembly simultaneously secures the torque tube within the channel of the clamp and solar module within the channel of the support rail to fix the solar module to the torque tube. The support rail includes a pair of angled slots defined through the pair of flanges that are angled at an upward angle extending towards a center portion of the support rail. In this manner, as the pair of legs is drawn towards one another, pins coupled to the pair of legs and the slots slide or otherwise translate within the pair of slots and cause the pair of legs to rise or otherwise be drawn into the apertures of the support rail.

It is envisioned that the clamp can be a unitary component, formed by stamping, milling, casting, etc. or may include pair of straps and a saddle. In this embodiment, the saddle is received within the channel formed between the pair of flanges of the support rail and a pair of ears disposed on an upper portion of the saddle is received within respective apertures of the support rail. A lower portion of the saddle includes a profile that is generally complimentary to that of the torque tube, although it is contemplated that the lower portion of the saddle may include any suitable profile. The saddle includes a pair of vertical slots defined therein configured to receive corresponding pins to couple the saddle to the support rail in a similar manner as described above. The pair of straps is coupled to the pair of pins at an upper end portion thereof and are coupled to a T-bolt and trunnion at a lower end portion thereof. In this manner, as a nut or other suitable fastener is rotated, the nut abuts a portion of the trunnion and draws the T-bolt towards the trunnion. Continued rotation of the nut causes the T-bolt and trunnion to be drawn further towards one another, causing the pair of straps to abut or otherwise squeeze the torque tube disposed therebetween. Additionally, as the pair of straps are drawn together, the torque tube is caused to be drawn upwards towards the support rail, which in turn, draws the ears of the saddle through the apertures to contact or squeeze the solar module disposed within one or both of the channels of the upper portion of the support rail. These and other aspects of the present disclosure will be described in detail herein below with reference to the drawings.

Referring now to the drawings, FIGS. 1-10 illustrate a clamp assembly for use with a solar module generally identified by reference numeral 10. The clamp assembly 10 includes a support rail 12, a clamp 40, and a fastening assembly 80.

The support rail 12 includes an elongate body 14 extending between opposed first and second end portions 14*a* and 14*b*, respectively, defining a longitudinal axis A-A. It is envisioned that the elongate body 14 may include any suitable length (e.g., dimension extending between the first and second end portions 14*a*, 14*b*) depending upon the design needs of the clamp assembly 10, and in one non-limiting embodiment, the elongate body 14 includes a length of approximately 450 mm. The elongate body 14 defines a generally I-beam configuration, although it is contemplated that the elongate body 14 may include any suitable configuration depending upon the design needs of the clamp assembly 10. In this manner, the elongate body 14 includes a planar center wall 16 extending vertically between opposed upper and lower portions 16*a* and 16*b*, respectively. The upper portion 16*a* includes an upper horizontal wall 18 disposed thereon in a generally perpendicular orientation with respect to the center wall 16 and the lower portion 16*b* includes a lower horizontal wall 20 disposed thereon in a generally perpendicular orientation with respect to the center wall 16. Although generally described as being disposed at a perpendicular orientation relative to the center wall 16, it is envisioned that the upper and lower horizontal walls 18, 20 may define any suitable orientation relative to the center wall 16 capable of receiving a portion of a solar module therebetween and may be parallel to or angled relative to one another. Although generally illustrated as bisecting the upper and lower horizontal walls 18, 20, it is envisioned that each of the upper and lower horizontal walls 18, 20 may be disposed on the center wall 16 at any suitable location and may be aligned or offset relative to one another. The center wall 16 and the upper and lower horizontal walls 18, 20 cooperate to define a pair of channels 22 and 24 on either side of the center wall 16 and orientated in juxtaposed relation to one another. As can be appreciated, each of the pair of channels 22, 24 is configured to selectively receive a portion of a respective solar module therein, as will be described in further detail hereinbelow.

The lower horizontal wall 20 includes opposed upper and lower surfaces 20*a* and 20*b*, respectively, extending between opposed first and second side surfaces 20*c* and 20*d* and the first and second end portions 14*a* and 14*b*. A pair of flanges 26 is disposed on the lower surface 20*b* adjacent respective first and second side surfaces 20*c*, 20*d* and extends between each of the first and second end portions 14*a*, 14*b* and away from the lower surface 20*b*. In this manner, the pair of flanges 26 define opposed inner and outer surfaces 26*a* and 26*b*, respectively such that the inner surfaces 26*a* define a channel 26*c* therebetween that is configured to selectively receive a portion of the clamp 40 therein, as will be described in further detail hereinbelow.

The lower horizontal wall 20 includes first and second apertures 28 and 30 defined through the upper and lower surfaces 20*a*, 20*b* thereof. The first and second apertures 28, 30 are defined generally equidistant from a center portion of the elongate body 14 such that the first aperture 28 is defined towards the first end portion 14*a* and the second aperture 30 is defined towards the second end portion 14*b*. Each of the first and second apertures 28, 30 extends transversely across the lower horizontal wall 20 and through a portion of the lower portion 16*b* of the center wall 16. In this manner, each of the first and second apertures 28, 30 is generally bisected by the center wall 16 and a respective slot 28*a* and 30*a* (FIG. 3) is defined through the lower portion 16*b* of the center wall 16 to provide clearance for a portion of the clamp 40 when the clamp 40 is coupled to the support rail 12, as will be described in further detail hereinbelow. It is contemplated that the first and second apertures 28, 30 may include any suitable dimension and may be the same or different to one another. In one non-limiting embodiment, the first and second apertures 28, 30 each have a width (e.g., dimension extending between the first and second side surfaces 20*c*, 20*d*) of approximately 29 mm and a length (e.g., dimension extending between the first and second end portions 14*a*, 14*b*) of approximately 5 mm).

Figure 4:
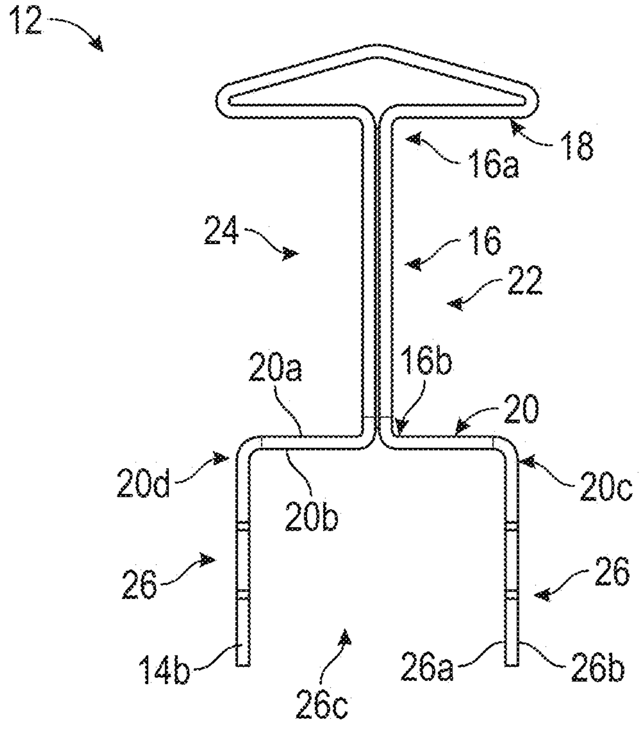
FIG. 4 is a side view of a support rail of the clamp assembly of FIG. 1.
Figure 5:
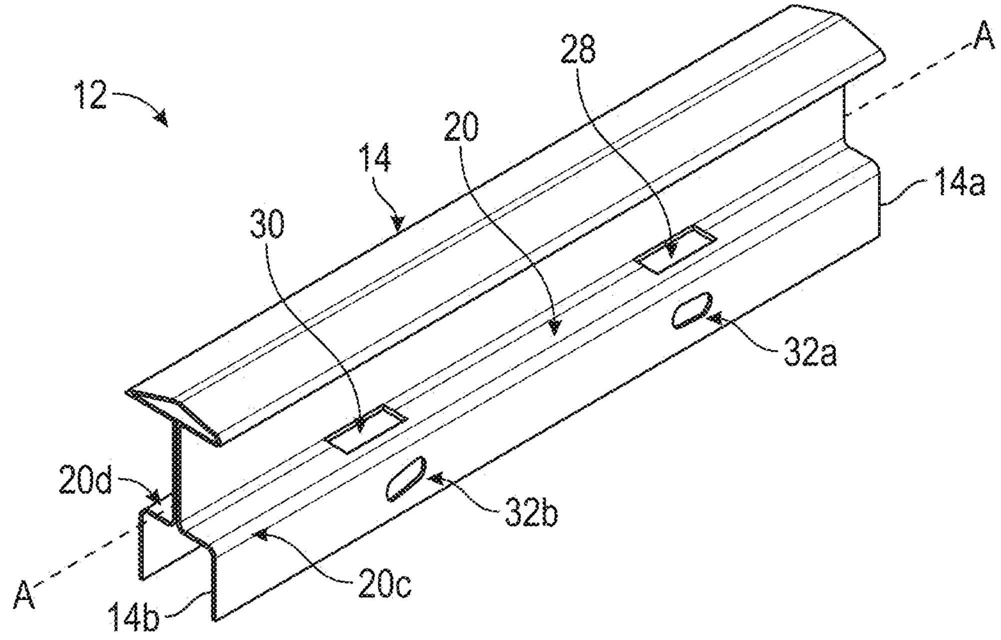
FIG. 5 is perspective view of the support rail of FIG. 4.
Figure 6:
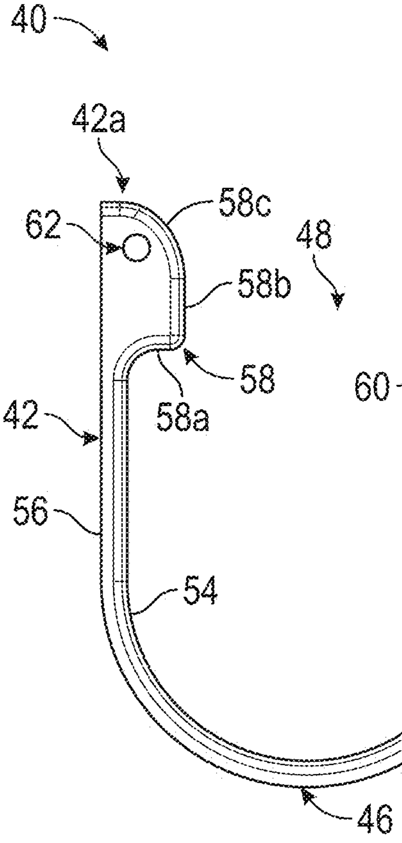
FIG. 6 is an elevation view of a clamp of the clamp assembly of FIG. 1.
Figure 7:
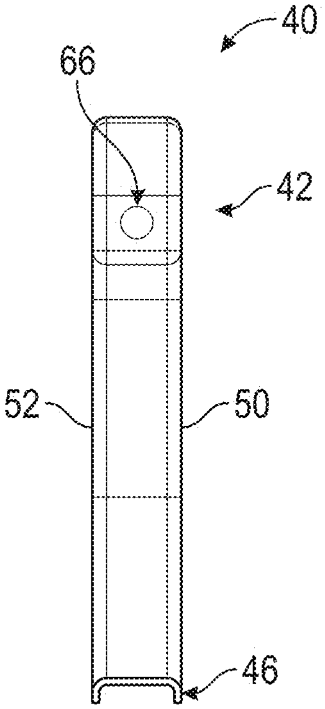
FIG. 7 is a side view of the clamp of FIG. 6.

Continuing with FIGS. 4 and 5, each of the pair of flanges 26 is substantially similar and therefore, only one flange of the pair of flanges 26 will be described herein in the interest of brevity. The flange 26 includes a pair of slots 32*a* and 32*b* defined therethrough that are generally vertically aligned with the first and second apertures 28, 30, and defined at a location generally centered on the flange 26, although it is contemplated that the pair of slots 32*a*, 32*b* may be disposed at any location along the length of the flange 26 and at any location vertically on the flange 26 depending upon the design needs of the clamp assembly 10. Each of the pair of slots 32*a*, 32*b* defines a generally oval or racetrack shape, although it is contemplated that the pair of slots 32*a*, 32*b* may include any suitable shape, such as circular, rectangular, amongst others, and may be the same or different than one another. In one non-limiting embodiment, each of the pair of slots 32*a*, 32*b* includes a generally oval shape having a length (e.g., dimension extending between the first and second end portions 14*a*, 14*b*) of approximately 10 mm and a radius of approximately 4.25 mm.

Each slot of the pair of slots 32*a*, 32*b* is defined at an angle relative to the longitudinal axis A-A of approximately 5.95 degrees in a mirrored configuration, such that each of the pair of slots 32*a*, 32*b* is angled upward towards the longitudinal axis A-A extending in a direction towards a center portion of the elongate body 14. Although generally described as defining an angle of approximately 5.95 degrees relative to the longitudinal axis A-A, it is envisioned that each of the pair of slots 32*a*, 32*b* may define any suitable angle relative to the longitudinal axis A-A and may be the same or different relative to one another, depending upon the design needs of the clamp assembly 10. Each of the pair of slots 32*a*, 32*b* is configured to receive a pin or fastener therein to couple a portion of the clamp 40 to the support rail 12. In this manner, as each respective pin or fastener is caused to be drawn towards a center portion of the support rail 12, the upward angle of the pair of slots 32*a*, 32*b* causes the pins or fasteners received therein to be raised towards the lower horizontal wall 20, and thereby cause a portion of the clamp 40 to engage or otherwise abut a portion of a solar module received within one or both of the channels 22 and 24, as will be described in further detail hereinbelow.

It is envisioned that the support rail 12 may be formed from a singular piece of material, such as a sheet of steel, aluminum, amongst others. In this manner, the profile of the support rail 12 is formed by bending, hydroforming, stamping, rolling, extruding, amongst others. In embodiments, the support rail 12 may be formed by extruding aluminum through a die having the general cross-sectional shape of the support rail 12. In embodiments, the elongate body includes a generally triangular or peaked portion adjacent the upper wall 18 to enable the support rail 12 to be formed from a continuous piece of material.

With reference to FIGS. 6-10, the clamp 40 defines a generally U-shaped profile, although it is contemplated that the clamp 40 may include any suitable profile depending upon the design needs of the clamp assembly 10. The clamp 40 includes first and second legs 42 and 44, respectively, joined at a crown 46 forming a channel 48 therebetween that is configured to selectively receive a portion of a torque tube 130 (FIGS. 1 and 3) therein. Each of the first and second legs 42, 44 extends from the crown 46 and terminates at a respective end portion 42*a* and 44*a*. Although generally illustrated as having a generally arcuate profile, it is envisioned that the crown 46 may include any suitable profile, such as planar (e.g., square, rectangular), hexagonal, pentagonal, octagonal, decagonal, racetrack, amongst others, and may be the same or different than a profile of the torque tube 130.

The clamp 40 includes opposed first and second side surfaces 50 and 52, respectively, extending between an inner surface 54 and an outer surface 56. The inner surface 54 includes a pair of first and second protuberances 58 and 60 disposed thereon adjacent each respective end portion 42*a*, 44*a* and extending towards in inner portion of the channel 48. Each protuberance of the first and second protuberances 58, 60 is substantially similar, and therefore, only one protuberance 58 will be described in detail herein in the interest of brevity. The protuberance 58 defines a generally rectangular profile having a generally planar lower surface 58*a*, a generally planar outer surface 58*b* defined generally perpendicular thereto, and an arcuate upper surface 58*c* extending from an upper portion of the planar outer surface 58*b* towards the end portion 42*a*. The outer surface 58*b* of the protuberance 58 reduces the width of the channel 48 to a width that is less than an outer dimension of the torque tube 130. In this manner, the pair of protuberances 58, 60 cooperate to retain a torque tube 130 received within the channel 48, such that the torque tube 130 is permitted to easily slide into the channel 48 but be inhibited from being easily removed from the channel 48. As will be described in further detail hereinbelow, in operation, as the torque tube 130 is advanced within the channel 48 of the clamp 40, an outer surface of the torque tube 130 abuts the arcuate outer surface 58*c* of the protuberance 58 and causes the first and second legs 42, 44 to splay outward or otherwise increase the width of the channel 48 to enable the torque tube 130 to advance past the pair of protuberances 58, 60 and be fully received within the channel 48. At this point, the generally planar lower surface 58*a* of the protuberance inhibits the torque tube 130 from being easily removed from the channel 48. As can be appreciated, the clamp 40 is formed from a resilient material capable of being elastically deformed as the torque tube 130 is advanced within the channel 48 and abuts the pair of protuberances 58, 60 and causes the first and second legs 42, 44 to splay outward. Once the torque tube 130 is received within the channel 48 and is advanced past the pair of protuberances 58, 60, the pair of legs 42, 44 are permitted to return to the undeformed condition to retain the torque tube 130 within the channel 48.

The first and second side surfaces 50, 52 of the clamp 40 include respective first and second through-holes 62 and 64 defined therethrough adjacent respective end portions 42*a*, 44*a* thereof. The first and second through-holes 62, 64 are configured to selectively receive a portion of a pin or fastener therethrough such that the clamp 40 is selectively secured to the support rail 12, as will be described in further detail hereinbelow. It is contemplated that the first and second through-holes 62, 64 may include any suitable dimension, and may be the same of different than one another. In one non-limiting embodiment, the first and second through-holes include a diameter of about 8.5 mm.

Each of the pair of legs 42, 44 includes a respective bolt hole 66 and 68 defined therethrough adjacent each respective end portion 42*a*, 44*a* and through the inner and outer surfaces 54 and 56 respectively. In embodiments, the bolt holes 66, 68 of each respective leg 42, 44 is generally coaxially aligned with one another to enable a fastener (e.g., bolt 86 (FIG. 2)) to be received therethrough, as will be described in further detail herein. Although generally described as being coaxial, it is envisioned that the bolt holes 66, 68 may be misaligned or otherwise formed at differing locations on each respective leg 42, 44 of the pair of legs depending upon the design needs of the clamp assembly 10. It is contemplated that the bolt holes 66 and 68 may include any suitable dimension and may be the same or different than one another. In one non-limiting embodiment, the bolt holes 66 and 68 include a diameter of about 11 mm.

Figure 8:
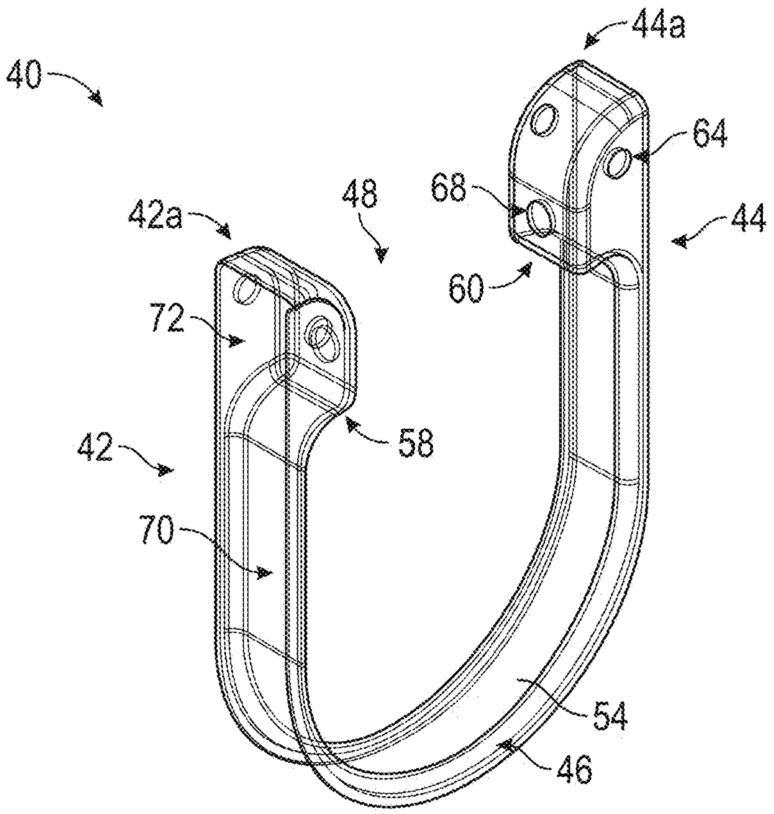
FIG. 8 is a perspective view of the clamp of FIG. 6.

With reference to FIG. 8, in embodiments, the clamp 40 may be formed from a singular piece of material, such as a sheet of steel, aluminum, amongst others. In this manner, the profile of the clamp 40 may be formed by bending, hydroforming, stamping, rolling, amongst others. In one non-limiting embodiment, the clamp 40 is stamped from a sheet having a thickness of about 1.5 mm. In this manner, the outer surface 56 defines a cavity 70 generally conforming to the overall shape of the clamp 40. As such, the cavity 70 defines a pair of pockets 72 defined within respective protuberances of the pair of protuberances 58 that are configured to receive portions of a fastener, such as a head of a bolt and/or a nut, amongst others.

Returning to FIG. 2, the fastener assembly 80 includes first and second pins or rivets 82 and 84, respectively, a bolt 86, a nut 88 configured to selectively engage a portion of a bolt 86, and a washer 90. The first and second pins 82, 84 are substantially similar to one another and therefore only the first pin 82 will be described herein in the interest of brevity. The first pin 82 includes an elongate body 82*a* extending between opposed first and second end portions 82*b* and 82*c*, respectively. Although generally illustrated as having a circular cross-section, it is contemplated that the elongate body 82*a* may include any suitable cross-section, such as oval, racetrack, square, rectangular, octagonal, amongst others. The elongate body 82*a* includes an outer dimension that is configured to be slidably received within a slot of the pair of slots 32*a*, 32*b* of the support rail 12 and rotatably received within a through-hole a respective first and second through-hole 62 and 64 of the clamp 40 such that the clamp 40 is slidably coupled to the support rail 12 via the respective slot of the pair of slots 32*a*, 32*b*. It is contemplated that the first pin 82 may be formed from a solid material (e.g., a solid bar), from a hollow material (e.g., a tube), from a sheet material rolled into shape (e.g., a roll pin, etc.), amongst others, and may be the same or different than the second pin 84. In one non-limiting embodiment, the first pin 82 is formed from a semi-tubular construction.

The first pin 82 includes first and second annular flanges 82*d* and 82*e* disposed adjacent each respective first and second end portion 82*b*, 82*c*. In embodiments, one of the first or second annular flanges 82*d*, 82*e* may include an outer dimension that is larger than the other. As can be appreciated, the first and second annular flanges 82*d*, 82*e* cooperate to inhibit the first pin 82 from easily being removed from the slot of the pair of slots 32*a*, 32*b* and/or the through-hole of the first and second through holes 62, 64. It is envisioned that the first and second annular flanges 82*d*, 82*e* may be integral with the elongate body 82*a* or may be separate from the elongate body 82*a* and fixedly coupled thereon via any suitable means, such as welding, press-fit, friction fit, adhesives, amongst others.

The bolt 86 is any suitable bolt capable of being selectively received within each of the bolt holes 66, 68. As can be appreciated, the bolt 86 includes an outer dimension and length that is capable of being received through each of the bolt holes 66, 68, and includes a head 86*a* or other suitable feature that is configured to abut or otherwise clamp against the outer surface 56 of the clamp 40. In this manner, it is envisioned that the bolt 86 may be a hex head bolt, a socket head cap screw, a button head screw, amongst others. In one non-limiting embodiment, the bolt 86 is an M10-1.5×110 mm long Socket Head Cap Screw.

The nut 88 includes an outer dimension that is configured to be received within the pocket 72 of the clamp 40 and is threadably engageable with the bolt 86. In embodiments, the nut 88 may include an outer dimension that is small enough such that a tool (e.g., socket, wrench, etc.) may engage the nut 88 when the nut 88 is placed within the pocket 72 of the clamp 40. In one non-limiting embodiment, the nut 88 includes an outer dimension that is substantially similar to a width of the pocket 72 such that the flats on the nut 88 abut or otherwise engage the inner portions of the pocket 72 to inhibit the nut 88 from rotating therewithin when the bolt 86 is rotated or otherwise threadably engaging the nut 88. It is envisioned that the nut 88 may be any suitable nut capable of threadably engaging the bolt 86, and in embodiments, may be an M10-1.5 nut.

The washer 90 defines a generally rectangular profile that generally corresponds to the inner dimensions of the pocket 72 of the clamp 40. In this manner, the washer 90 is configured to be received within the pocket 72 and be interposed between the outer surface 56 of the clamp 40 and a portion of the nut 88, such that the washer 90 acts as a bearing surface against the nut 88. In one non-limiting embodiment, the washer includes a rectangular profile having outer dimensions of 25 mm×19 mm and 3 mm thick and includes as through-bore 92 having an inner dimension of about 10 mm to accommodate receipt of the bolt 86 therethrough.

Figure 9:
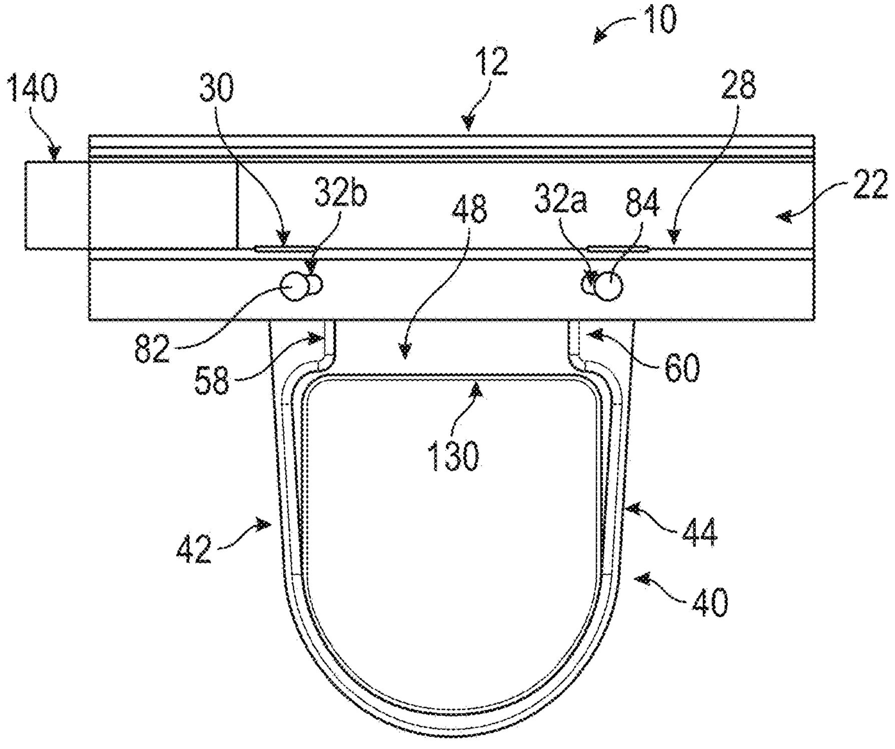
FIG. 9 is an elevation view of the clamp assembly of FIG. 1 illustrating a solar module partially inserted into the support rail.
Figure 10:
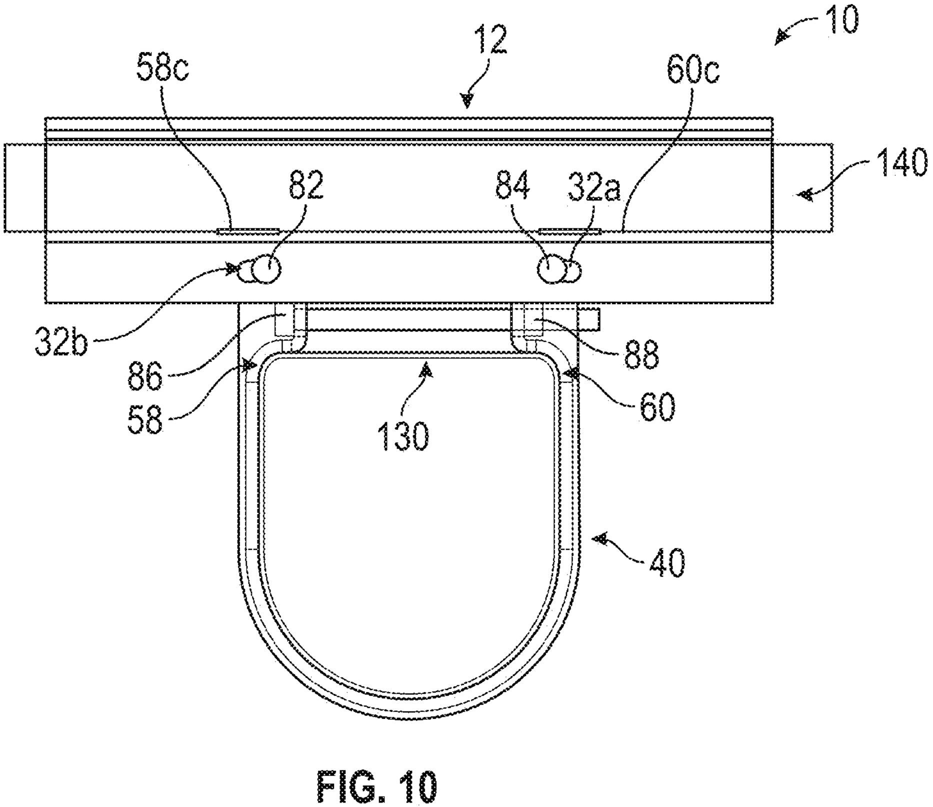
FIG. 10 is an elevation view of the clamp assembly of FIG. 1 illustrating a solar module inserted into the support rail.

With reference to FIGS. 9 and 10, in operation, the torque tube 130 is placed adjacent the channel 48 of the clamp 40 such that the torque tube 130 is adjacent the pair of protuberances 58, 60 of the clamp 40. At this point, the torque tube 130, or in embodiments, the clamp 40, may be advanced toward the other such that an outer surface of the torque tube 130 abuts or otherwise contacts the pair of protuberances 58, 60. The clamp 40 is further advanced towards the torque tube 130 such that the outer surface of the torque tube 130 pushes against the pair of protuberances 58, 60 and causes the pair of legs 42, 44 of the clamp 40 to splay outward (e.g., increase a width of the channel 48 between the pair of protuberances 58, 60) to accommodate the outer dimension of the torque tube. Continued advancement of the clamp 40 towards the torque tube 130 causes the torque tube 130 to be received within the channel 48 of the clamp 40 such that the outer surface of the torque tube 130 is below (e.g., past) the pair of protuberances 58, 60, thereby permitting the pair of legs 42, 44 to return to their undeformed shape and thereby retaining the torque tube 130 within the channel 48, In embodiments, the pair of legs 42, 44 return to a substantially undeformed shape, where the pair of legs 42, 44 remain partially played when the clamp is placed in a first, unlocked condition. Although generally described as being received within the channel 48 of the clamp 40 in a radial direction (e.g., transverse to a longitudinal of the torque tube 130), it is envisioned that the torque tube 130 may be advanced within the channel 48 of the clamp 40 in a longitudinal or axial direction (e.g., transverse to the channel 48), depending upon the installation needs of the clamp assembly 10.

With the torque tube 130 received within the channel 48 of the clamp 40 and the clamp placed in the first, unlocked condition, the end portions 42*a*, 44*a* of the pair of legs 42, 44 of the clamp 40 are advanced within the channel 26*c* of the support rail 12. The pair of legs 42, 44 of the clamp 40 are further advanced within the channel 26*c* of the support rail 12 and the upper portions 42*a*, 44*a* of each of the pair of legs 42, 44 is received within respective first and second apertures 28, 30 of the support rail 12. Once the upper portions 42*a*, 44*a* of the pair of legs 42, 44 are received within the first and second apertures 28, 30 of the support rail 12, each of the first and second pins 82, 84 is advanced within a respective slot of the pair of slots 32*a*, 32*b* of the support rail 12. The first and second pins 82, 84 are further advanced within the pair of slots 32*a*, 32*b* and received within a respective first and second through-hole 62, 64 of the clamp 40. Continued advancement of the first and second pins 82, 84 causes the first and second pins 82, 84 to be received in corresponding slots of the pair of slots 32*a*, 32*b* on the second flange of the pair of flanges 26 of the support rail 12 such that the clamp 40 is slidably and rotatably coupled to the support rail 12 via the first and second pins 82, 84.

As can be appreciated, when the clamp 40 is coupled to the support rail 12 and placed in the first, unlocked condition, each of the first and second pins 82, 84 is located within the respective pair of slots 32*a*, 32*b* towards each respective first and second end portion 14*a*, 14*b* of the support rail 12 (e.g., the channel 48 is placed in its widest configuration). In the first, unlocked condition, the arcuate upper surface 58*c*, 60*c* of each of the pair of protuberances 58, 60 is disposed either below the upper surface 20*a* of the support rail 12, generally level with the upper surface 20*a* of the support rail 12, or slightly above the upper surface 20*a* of the support rail 12. In this manner, a portion of one or more solar modules 140 is permitted to be slidably received within one or both of the pair of channels 22, 24 without interference from the arcuate upper surface 58*c*, 60*c* of the clamp 40 (e.g., the solar modules 140 are permitted to freely slide within one or both of the pair of channels 22, 24).

With the solar modules 140 received within one or both of the pair of channels 22, 24 of the support rail 12 and placed in their desired location relative to each other and the torque tube 130, the bolt 86 is advanced within the bolt holes 66, 68 of the clamp 40. Once the bolt 86 is received within the bolt holes 66, 68, the washer 90 is advanced over the bolt 86, and thereafter, the nut 88 is threaded onto the bolt 86 such that the washer 90 is interposed between the nut 88 and the outer surface 56 of the clamp 40. At this point, the one or both of the bolt 86 and nut 88 is rotated in a first direction to cause the head of the bolt 86 to abut the outer surface 56 of the first leg 42 of the clamp 40 and the nut 88 to abut the washer 90, which in turn abuts the outer surface 56 of the second leg 44 of the clamp 40. Due to the angle of each of the pair of slots 32*a*, 32*b*, further rotation of the bolt 86 and/or nut 88 causes the first and second legs 42, 44 of the clamp 40 to be drawn towards one another, which in turn, causes the first and second pins 82, 84 to translate or otherwise slide within the pair of slots 32*a*, 32*b* and draw the first and second legs 42, 44 of the clamp 40 towards the solar module 140. As such, further rotation of the bolt 86 and/or nut 88 causes the arcuate upper surfaces 58*c*, 60*c* of the first and second legs 42, 44 to clamp or otherwise squeeze the solar modules 140 within the pair of channels 22, 24 while generally simultaneously clamping the torque tube 130 within the channel 48 of the clamp 40. As can be appreciated, continued rotation of the bolt 86 and/or nut 88 in the first direction causes the torque tube 130 to be clamped within the channel 48 of the clamp and causes the solar modules 140 to be clamped within the channels 22, 24 to inhibit or otherwise prevent movement of the torque tube and solar modules relative to the clamp and/or support rail 12.

Figure 11:
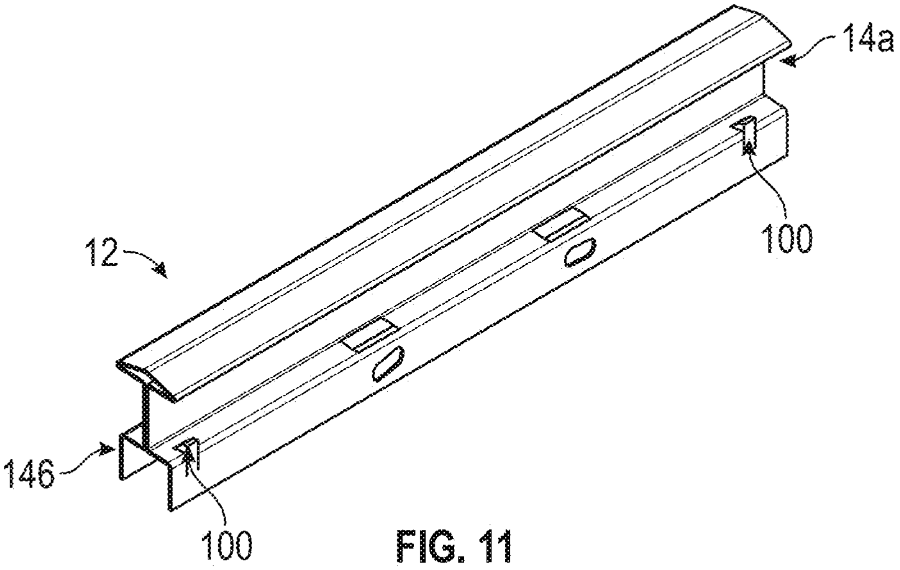
FIG. 11 is a perspective view of another embodiment of a support rail provided in accordance with the present disclosure.
Figure 12:
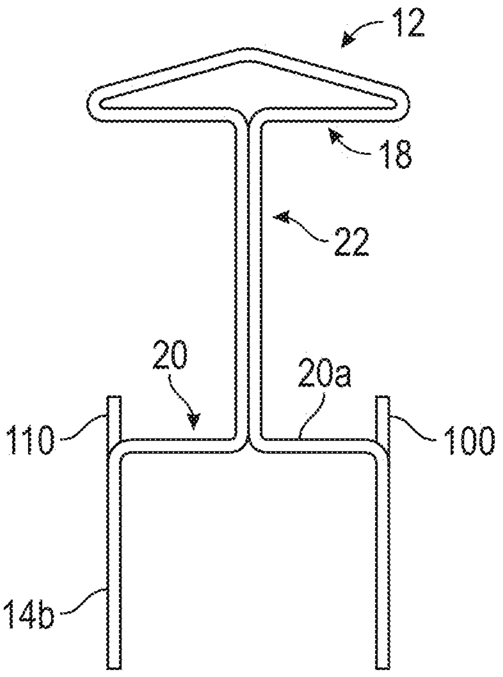
FIG. 12 is a side view of the support rail of FIG. 11.
Figure 13:
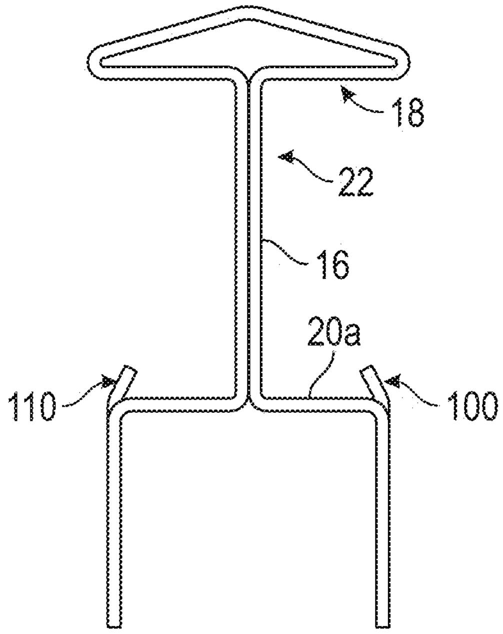
FIG. 13 is a side view of another embodiment of a support rail provided in accordance with the present disclosure.
Figure 14:
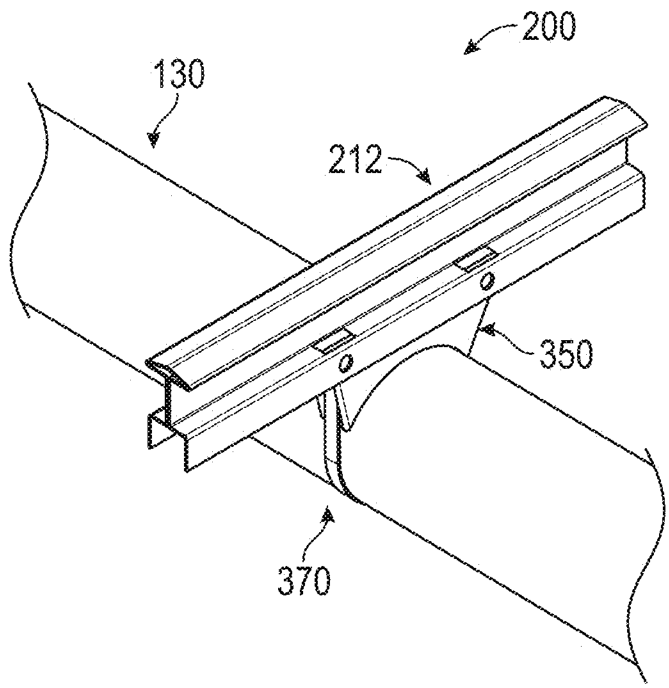
FIG. 14 is a perspective view of another embodiment of a clamp assembly provided in accordance with the present disclosure.

With reference to FIGS. 11-13, it is contemplated that the support rail 12 may include a first and second pair of tabs 100 and 110, respectively. The first and second pair of tabs 100, 110 are substantially similar, and therefore, only the first pair of tabs 100 will be described in detail hereinbelow in the interest of brevity. The first pair of tabs 100 is disposed on the upper surface 20*a* of the lower horizontal wall 20 of the support rail 12 and extend vertically therefrom (e.g., towards the upper horizontal wall 18). It is contemplated that the first pair of tabs 100 may be integrally formed with the support rail 12 or may be a separate component that is coupled to the lower horizontal wall 20 using any suitable means, such as welding, fasteners, adhesives, amongst others. In one non-limiting embodiment, the pair of tabs 100 is formed by stamping and/or folding the first pair of tabs 100 from the lower horizontal wall 20. The first pair of tabs 100 is resilient, such that the first pair of tabs 100 is configured to be deformed as a solar module 140 is advanced within the channel 22 from a direction that is transverse to a length of the support rail 12. It is envisioned that each the first pair of tabs 100 is disposed on the upper surface 20*a* of the lower horizontal rail 20 adjacent each respective first and second end portion 14*a*, 14*b* of the support rail 12, although it is contemplated that the first pair of tabs 100 may be disposed at any location along the length of the support rail 12 and may be in the same or different locations relative to the second pair of tabs 110 and/or relative to each respective first and second end portion 14*a*, 14*b*.

Each of the first pair of tabs 100 is configured to be selectively received within a corresponding slot or aperture (not shown) formed a portion of the solar module 140, such that when the solar module 140 is received within the channel 22 of the support rail 12, the first pair of tabs 100 is received within the pair of apertures of the solar module 140 to lock or otherwise fix the location of the solar module 140 relative to the support rail 12. As can be appreciated, the location of the pair of apertures of the solar module 140 is such that the solar module 140 is generally centered on the support rail 12 to ensure that each solar module 140 is placed in the same location relative to a respective support rail 12 and generally aligned with one another along the length of the torque tube 130. In embodiments, each of the first pair of tabs 100 includes a length of 18 mm, a height of 8 mm, and a thickness of 1.5 mm, although it is contemplated that the first pair of tabs 100 may include any suitable dimension and each of the tabs of the first and second pair of tabs 100, 200 may include the same or different dimensions.

In embodiments, the first pair of tabs 100 may define an angle relative to the upper surface 20*a* of the lower horizontal rail such that the first pair of tabs 100 is angled towards the center wall 16 (FIG. 13). As can be appreciated, the angle of the first pair of tabs 100 towards the center wall 16 promotes easier deformation of the first pair of tabs 100 as the solar module 140 is advanced within the channel 22 of the support rail 12.

With reference to FIGS. 14-21, another embodiment of a clamp assembly is illustrated and generally identified by reference numeral 200. The clamp assembly 200 includes a support rail 212, a pair of pins or rivets 282 and 284, respectively, a saddle 350, and a strap assembly 370.

Figure 17:
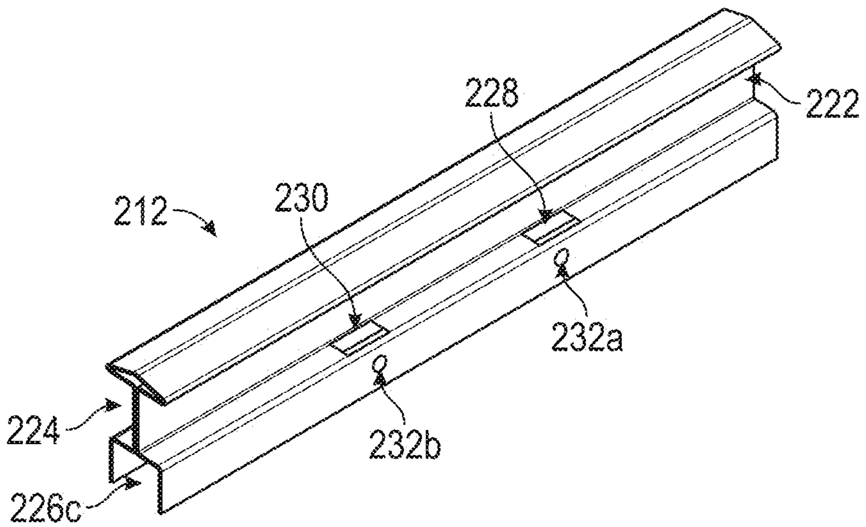
FIG. 17 is a perspective view of a support rail of the clamp assembly of FIG. 14.

With reference to FIG. 17, the support rail 212 is substantially similar to the support rail 12 except that the pair of slots 32*a* and 32*b* is replaced with a corresponding pair of through-holes 232*a* and 232*b*. Each of the pair of through-holes 232*a*, 232*b* includes a generally circular profile corresponding substantially to the circular profile of the first and second pins 282, 284.

Figure 18:
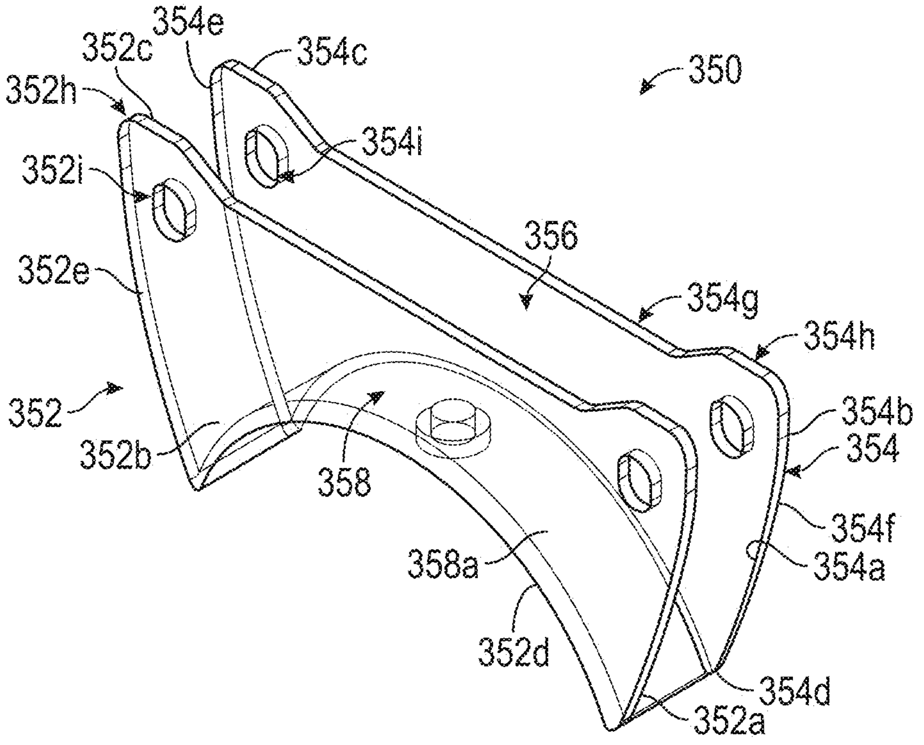
FIG. 18 is a perspective view of a saddle of the clamp assembly of FIG. 14.
Figure 19:
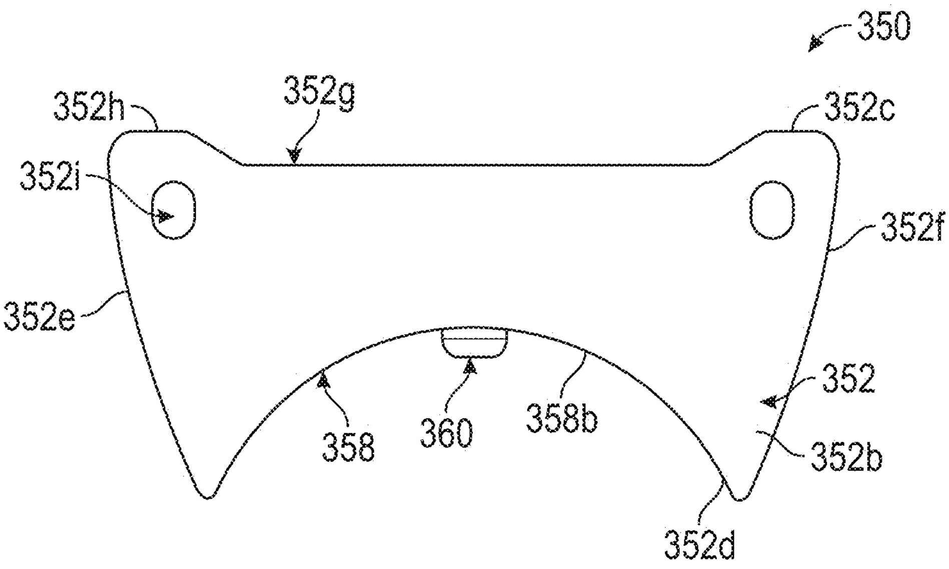
FIG. 19 is an elevation view of the saddle of FIG. 18.

With reference to FIGS. 18 and 19, the saddle 350 defines a generally U-shaped profile including a pair of flanges 352 and 354 disposed in spaced relation to one another and defining as channel 356 therebetween. Each of the pair of flanges defines respective inner and outer surfaces 352*a*, 354*a* and 352*b*, 354*b*, respectively extending between upper and lower surfaces 352*c*, 354*c* and 352*d*, 354*d* respectively and first and second side surfaces 352*e*, 354*e* and 352*f*, 354*f*, respectively. The lower surfaces 352*d*, 354*d* of the pair of flanges 352, 354 define an arcuate profile oriented in a generally concave orientation. In embodiments, the lower surfaces 352*d*, 354*d* include a dimension and/or profile that is complementary to that of the torque tube 130 such that the saddle 350 may more easily clamp or otherwise secure the torque tube 130 thereto.

Although generally illustrated as having an arcuate profile, it is envisioned that the first and second side surfaces 352*e*, 354*e* and 352*f*, 354*f* of the pair of flanges 352, 354, respectively may include any suitable profile, such as linear, concave, convex, amongst others and may be disposed in a vertical configuration, diagonal configuration, amongst others. The upper surfaces 352*c*, 354*c* of the pair of flanges 352, 354 define a recess 352*g*, 354*g* therein extending towards the lower surfaces 352*d*, 354*d*, respectively. In this manner, the recesses 352*g*, 354*g* define a respective pair of ears 352*h* and 354*h*, respectively that are configured to be received within corresponding first and second apertures 228, 230 (FIG. 17) of the support rail 212 such that as the clamp assembly 200 is tightened against a torque tube 130, each ear of the pair of ears 352*h*, 354*h* is received within respective first and second apertures 228, 230 and abuts a portion of a solar module 140 received within a respective channel of the pair of channels 222 and 224 of the support rail 212 and clamp or otherwise secure the solar module 140 to the support rail 212.

Each of the pair of flanges 352, 354 includes a pair of slots 352*i* and 354*i* respectively, through the inner and outer surfaces 352*a*, 354*a* and 352*b*, 354*b* and disposed adjacent the upper surfaces 352*c*, 354*c* and the first and second side surfaces 352*e*, 354*e* and 352*f*, 354*f*. The pair of slots 352*h*, 354*h* includes an elliptical or otherwise racetrack profile extending in a vertical direction (e.g., between the upper and lower surfaces 352*a*, 354*a* and 352*b*, 354*b*) and is configured to receive a portion of the pair of pins 282, 284 therein to couple the saddle 350 to the support rail 212, as will be described in further detail hereinbelow.

A bridge 358 is disposed within the channel 356 adjacent the lower surfaces 352*d*, 354*d* such that the bridge 358 is interposed between each of the inner surfaces 352*a*, 354*a* of the pair of flanges 352, 354, respectively. The bridge 358 defines an upper surface 358*a* and an opposite lower surface 358*b* and defines a profile that generally corresponds to the arcuate profile of the lower surfaces 352*d*, 354*d* of the pair of flanges 352, 354, respectively. Although generally illustrated as extending between each of the first and second side surfaces 352*e*, 354*e* and 352*f*, 354*f* of the pair of flanges 352, 354, it is envisioned that the bridge 358 may extend any length between the first and second side surfaces 352*e*, 354*e* and 352*f*, 354*f* depending upon the design needs of the saddle 350. It is envisioned that the saddle 350 may be coupled to each of the pair of flanges 352, 354 using any suitable means, such as welding, adhesives, fasteners, amongst others. In one non-limiting embodiment, the saddle 350 is constructed as a unitary component and is formed by stamping, molding, amongst others and may be formed from a metallic material, a non-metallic material, a composite, amongst others.

A protuberance 360 (FIG. 19) is disposed on the lower surface 358*b* of the bridge 358 and extends therefrom. The protuberance 360 includes a generally cylindrical profile, although it is contemplated that the protuberance 360 may include any suitable profile, such as circular, spherical, rectangular, square, octagonal, amongst others. It is envisioned that the protuberance 360 may be coupled to the lower surface 358*b* of the bridge 358 using any suitable means, such as welding, adhesives, fasteners, amongst others. As can be appreciated, the protuberance 360 is configured to abut or otherwise press against an outer portion of the torque tube 130 when the saddle 350 is disposed thereon to inhibit or otherwise prevent movement of the saddle 350 relative to the torque tube 130 when the saddle 350 is clamped or otherwise secured to the torque tube 130, as will be described in further detail hereinbelow.

Figure 15:
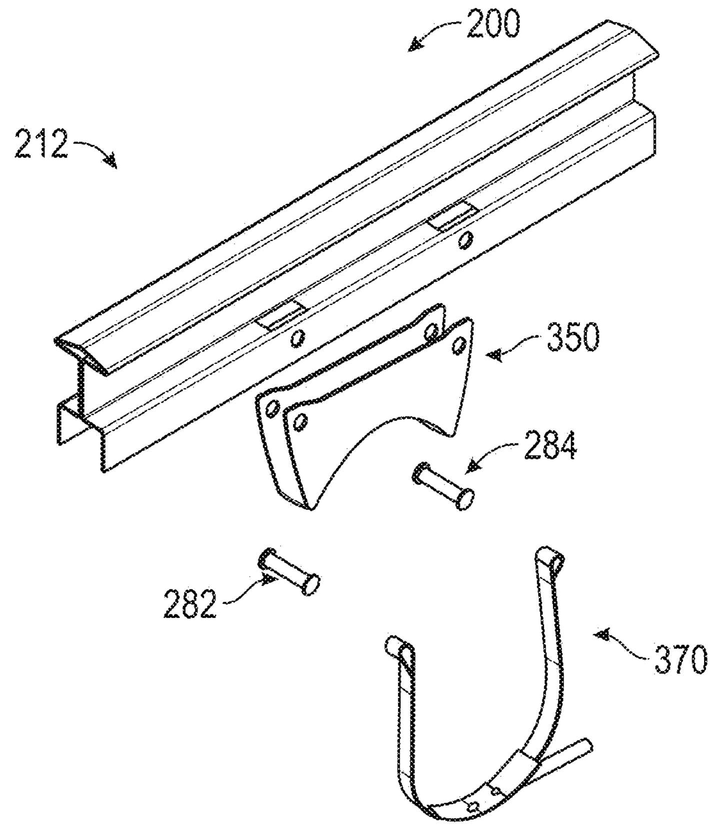
FIG. 15 is an exploded, perspective view, of the clamp assembly of FIG. 14.
Figure 16:
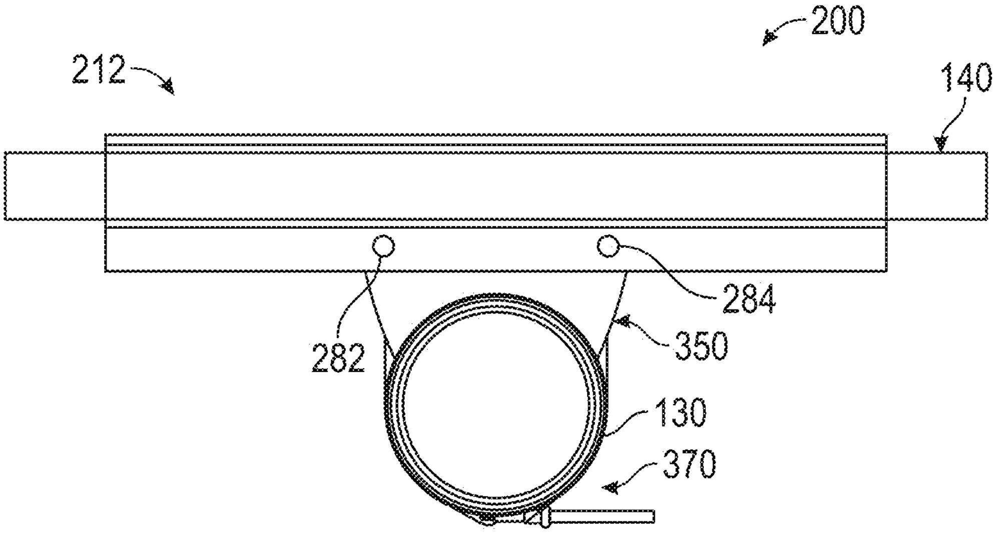
FIG. 16 is an elevation view of the clamp assembly of FIG. 14.
Figure 20:
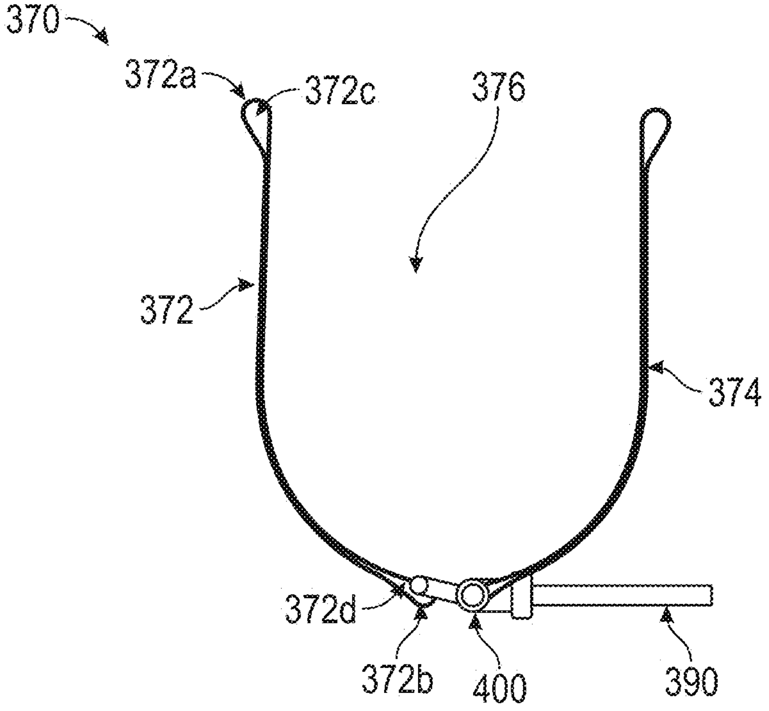
FIG. 20 is an elevation view of a strap assembly of the clamp assembly of FIG. 14.
Figure 21:
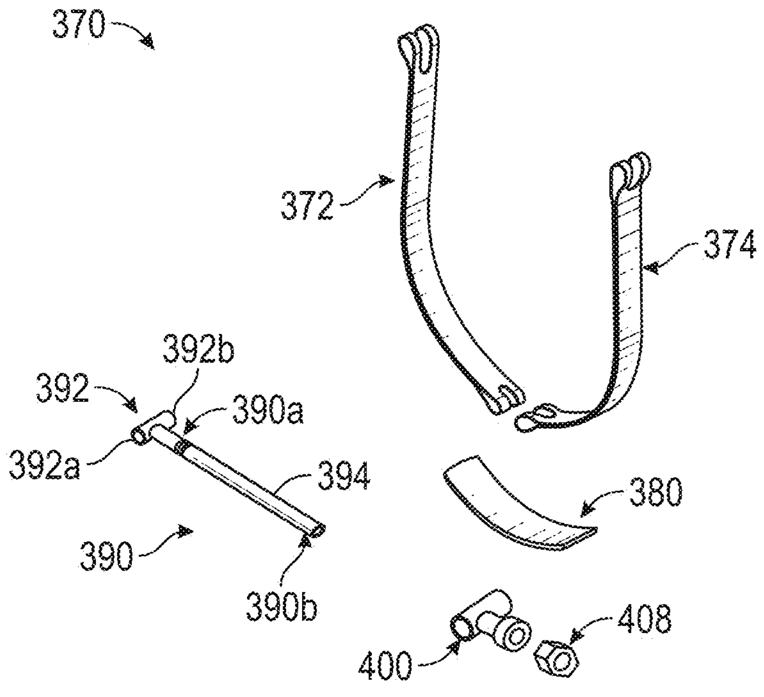
FIG. 21 is an exploded, perspective view, of the strap assembly of FIG. 20.
Figure 22:
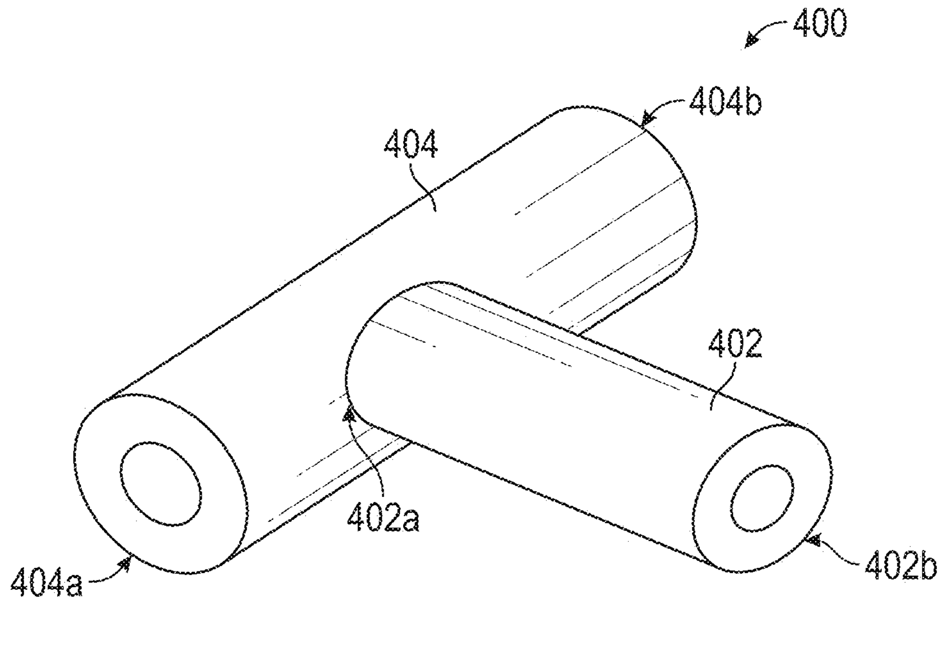
FIG. 22 is a perspective view of a trunnion of the strap assembly of FIG. 20.

With reference to FIGS. 15 and 16 and with additional reference to FIGS. 20-22, the strap assembly 370 includes a pair of straps 372 and 374, respectively, a strap connector 380, a strap bolt 390, and a trunnion 400. Each of the pair of straps 372, 374 is substantially similar to one another and therefore only on strap 372 of the pair of straps 372, 374 will be described in detail herein in the interest of brevity. The strap 372 defines a generally lazy "L" shaped profile extending between opposed first and second end portions 372*a*, 372*b*, respectively. Each of the first and second end portions 372*a*, 372*b* includes an eye or loop 372*c* and 372*d*, respectively. The eye 372*c* is configured to rotatably receive a portion of the pin 282 therein to rotatably couple the strap 372 to the support rail 212 and rotatably and slidably couple the strap 372 to the saddle 350. The eye 372*d* is configured to rotatably receive a portion of the strap bolt 390 to rotatably couple the strap bolt 390 to the strap 372. As can be appreciated, the eye 374*d* of the corresponding strap 374 is configured to rotatably receive a portion of the trunnion 400 to rotatably couple the trunnion 400 to the strap 374*d*. The pair of straps 372, 374 cooperate to define a channel 376 therebetween that is configured to receive a portion of a torque tube 130 therein, as will be described in further detail hereinbelow.

The strap connector 380 defines a generally rectangular configuration having an arcuate profile that generally corresponds to the arcuate profile of each of the pair of straps 372, 374 adjacent the second end portions 372*b*, 374*b*. In this manner, the strap connector 380 is disposed within the channel 376 and is interposed between the torque tube 130 and the pair of straps 372, 374 to provide a bearing surface upon which the pair of straps 372, 374 can slide relative to the torque tube 130 to promote sliding of the pair of straps 372, 374 relative to the torque tube 130 without damaging or otherwise catching on the torque tube 130. In embodiments, the strap connector 380 may be coupled to one strap of the pair of straps 372, 374 to inhibit the strap connector 380 from becoming disengaged from the pair of straps 372, 374 and/or the torque tube 130 as the pair of straps 372, 374 is clamped or otherwise tightened against the torque tube 130.

The strap bolt 390 defines a generally T-shaped profile having a transverse portion 392 defining a pair of legs 392*a*, 392*b* disposed at a first end portion 390*a* of the strap bolt and having a longitudinal threaded portion 394 adjacent a second end portion 390*b*. The pair of legs 392*a*, 392*b* is configured to be rotatably received within the eye 372*d* of the strap 372 and the threaded portion 394 is configured to be slidably received within a portion of the trunnion 400 and threadably engage a nut or other suitable fastening device, as will be described in further detail hereinbelow. Although generally illustrated as having a bend adjacent the transverse portion 392, it is envisioned that the strap bolt 390 may be straight or otherwise linear along its length, depending upon the design needs of the strap assembly 370. In one non-limiting embodiment, the strap bolt 390 may be an M6 bent T-bolt.

The trunnion 400 defines a generally T-shape profile having a longitudinal portion 402 extending between opposed first and second end portions 402*a* and 402*b*, respectively, and a transverse portion 404 disposed on the second end portion 402*b* of the longitudinal portion 402 and extending between respective first and second end portions 404*a* and 404*b*, respectively. The transverse portion 404 defines a generally circular profile having an outer dimension that is configured to be rotatably received within the eye 374*d* of the strap 374. Although generally described as having a circular profile, it is contemplated that the transverse portion 374 may include any suitable profile, such as square, oval, racetrack, hexagonal, amongst others. The longitudinal portion 402 defines a generally circular profile and includes a bore 406 defined therein and extending through the first and second end portions 402*a*, 402*b*. The bore 406 is configured to slidably receive a portion of the strap bolt 390 therethrough such that a portion of the longitudinal threaded portion 394 adjacent a second end portion 390*b* of the strap bolt extends past the first end portion 402*a* of the longitudinal portion 402. As can be appreciated, the longitudinal threaded portions 394 of the strap bolt 390 is permitted to translate within the bore 406 of the trunnion 400 to enable the strap bolt 390 to draw the eye 372*d* of the strap 372 and the eye 374*d* of the strap 374 towards one another to clamp or otherwise squeeze a torque tube 130 received between each of the straps 372, 374. In this manner, a nut 408 or other suitable fastening device is threadably coupled to the longitudinal threaded portion 394 of the strap bolt 390 such that as the nut 408 is rotated in a first direction, the nut abuts a the first end portion 402*a* of the trunnion 400 and causes the eyes 372*d*, 374*d* of the straps 372, 374 to be drawn towards one another, and when the nut 408 is rotated in a second, opposite direction, the nut is caused to be drawn away from the first end portion 402*a* to permit the eyes 372*d*, 374*d* of the straps 372, 374 to be pulled or drawn away from one another and release the torque tube 130 disposed between the straps 372, 374.

With continued reference to FIGS. 14-22, in operation, the clamp assembly 200 is initially assembled by advancing the saddle 350 within the channel 226*c* of the support rail 212 such that the pair of ears 352*h* and 354*h* of the saddle is received within respective first and second apertures 228, 230 of the support rail 212. Once the pair of ears 352*h*, 354*h* is received within the first and second apertures 228, 230 of the support rail 212, the eyes 372*c*, 374*c* of the pair of straps 372, 374 are advanced within opposing sides of the channel 356 of the saddle 350 and generally aligned with the pair of slots 352*i*, 354*i* of the saddle 350 and the pair of through-holes 232*a*, 232*b* of the support rail 212. At this point, each of the pair of pins 282, 284 is advanced within a respective through-hole of the pair of through-holes 232*a*, 232*b* of the support rail 212. The pair of pins 282, 284 is further advanced within the pair of through-holes 232*a*, 232*b* and received within a respective slot of the pair of slots 352*i*, 354*i* of the saddle 350, and thereafter, the eyes 372, 374*c* of the pair of straps 372, 374, and the pair of through-holes 232*a*, 232*b* on the second flange of the pair of flanges 226 of the support rail 212 such that the saddle 350 and the pair of straps 372, 374 is coupled to the support rail 212 via the pair of pins 282, 284. At this point, the strap bolt 390 may be coupled to the eye 372*d* of the strap 372 and the trunnion 400 may be coupled to the eye 374*d* of the strap 374 with the strap bolt 390 slidably received with the bore 406 of the trunnion 400 and the nut 408 threadably engaged with the threaded longitudinal threaded portion 394 of the strap bolt 390. Although generally described as being coupled to the eyes 372*d*, 374*d* after the pair of straps 372, 374 is coupled to the support rail 212, is it envisioned that the strap bolt 390 and trunnion 400 may be coupled to the pair of straps 372, 374 at any given point in time during assembly of the clamp assembly 200.

With the clamp assembly 200 assembled and placed in a first, unlocked position, a torque tube 130 is placed between the pair of straps 372, 374 such that an outer surface of the torque tube 130 is disposed adjacent the bridge 358 of the saddle 350. At this point, the torque tube 130, or in embodiments, the clamp assembly 200, may be advanced toward one another until the clamp assembly 200 is located at a desired position on the torque tube 130. Once the clamp assembly 200 is placed at the desired location, one or more solar modules 140 is permitted to be slidably received within one or both of the pair of channels 222, 224 of the support rail 212 without interference from the pair of ears 352*h*, 354*h* of the saddle placed generally level with the upper surface 220*a* of the support rail 212, or slightly above the upper surface 220*a* of the support rail 212 (e.g., the solar modules 140 are permitted to freely slide within one or both of the pair of channels 222, 224).

With the solar modules 140 received within one or both of the pair of channels 222, 224 of the support rail 212 and placed in their desired location relative to each other and the torque tube 130, the nut 408 is rotated in the first direction to abut the first end portion 402*a* of the trunnion 400 and cause the eyes 372*d*, 374*d* of the straps 372, 374 to be drawn towards one another. Continued rotation of the nut 408 in the first direction causes the pair of pins 282, 284 to translate downward towards a lower portion of the pair of 352*i*, 354*i* of the saddle 350 to clamp or otherwise secure the torque tube 130 between the pair of straps 372, 374 and the saddle 350. Simultaneously, the pair of ears 352*h*, 354*h* of the saddle 350 to protrude through the first and second apertures 228, 230 of the support rail 212 and abut or otherwise squeeze the solar modules 140 within the pair of channels 222, 224 and inhibit or otherwise prevent movement of the torque tube 130 and solar modules 140 relative to the clamp assembly 200. As can be appreciated, to loosen or otherwise disengage the clamp assembly from the torque tube 130 and/or solar modules 140, the nut 408 may be rotated the second, opposite direction to permit the pair of straps 372, 374 to rotate away from one another and disengage from the torque tube 130 and/or solar modules 140. Although generally described as being assembled in a certain order, it is envisioned that the clamp assembly 200 may be assembled in any suitable order, depending upon the design needs of the clamp assembly 200 and/or installation needs of the clamp assembly 200.

It is envisioned that the clamp assembly 200 may be utilized with any of the support rails described herein, an in embodiments the support rail 212 may include the first and second pair of tabs 100 and 110 described herein above. As can be appreciated, assembly of the solar modules to the support rail 212 with the pair of tabs 100, 110 is substantially similar to that described hereinabove, and therefore, will not be described in detail herein in the interest of brevity.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling system for use with a solar tracker, comprising:

- a support rail, the support rail defining a channel for receipt of a solar module therein, the support rail including an aperture defined therein that is in open communication with the channel; and
- a clamp assembly, comprising:
  - a saddle selectively coupled to a portion of the support rail, a portion of the saddle configured to selectively extend through the aperture of the support rail; and
  - a pair of straps selectively coupled to a portion of the saddle and configured to selectively receive a portion of a torque tube therebetween,
  - wherein the pair of straps is configured to transition from a first, unlocked position, to a second, locked position, wherein the pair of straps effectuate extension of the portion of the saddle through the aperture of the support rail to abut a portion of a solar module disposed within the channel to selectively secure the solar module within the channel.

2. The coupling system according to claim 1, further comprising at least one pin for selectively coupling a portion of the saddle to the support rail.

3. The coupling system according to claim 2, wherein the at least one pin is received within a slot defined through a portion of the saddle.

4. The coupling system according to claim 1, further comprising a fastener assembly, the fastener assembly operably coupled to a portion of the pair of straps and configured to transition the pair of straps from the first, unlocked position, to the second, locked position.

5. The coupling system according to claim 4, wherein the fastener assembly includes a strap bolt operably coupled to a portion of a first strap of the pair of straps and a trunnion operably coupled to a portion of a second strap of the pair of straps and operably coupled to a portion of the strap bolt.

6. The coupling system according to claim 1, wherein a portion of the saddle includes a protuberance disposed thereon configured to abut a portion of a torque tube interposed between the pair of straps.

7. A coupling system for use with a solar tracker, the coupling system comprising:

a support rail, the support rail defining a channel for receipt of a solar module therein, the support rail including a pair of apertures in open communication with the channel, the support rail further including a pair of through-holes corresponding to the pair of apertures; and a clamp assembly, the clamp assembly comprising:

a saddle selectively coupled to a portion of the support rail via a pair of pins configured to extend through the pair of through-holes of the support rail, a portion of the saddle configured to selectively extend through at least one of the pair of apertures of the support rail; and a pair of straps selectively coupled to the saddle via the pair of pins, the pair of straps configured to selectively receive a portion of a torque tube therebetween, wherein the pair of straps is configured to transition from a first unlocked position to a second locked position, wherein the pair of straps is configured to effectuate extending the portion of the saddle through at least one of the pair of apertures of the support rail to thereby abut a portion of the solar module disposed within the channel to selectively secure the solar module within the channel.

8. The coupling system of claim 7, wherein the saddle comprises a pair of slots configured to receive the pair of pins to selectively couple the saddle to the portion of the support rail.

9. The coupling system of claim 7, wherein the saddle comprises a pair of ears configured to selectively extend through the pair of apertures of the support rail.

10. The coupling system of claim 7, wherein a lower portion of the saddle has a profile that is generally complementary to a profile of the torque tube.

11. The coupling system of claim 10, wherein the lower portion of the saddle further comprises a protuberance disposed thereon configured to abut a portion of the torque tube received between the pair of straps.

12. The coupling system of claim 7, further comprising:

a strap bolt operably coupled to a portion of a first strap of the pair of straps; and a trunnion operably coupled to a portion of a second strap of the pair of straps, the trunnion configured to be operably coupled to the strap bolt, wherein the strap bolt and the trunnion are configured to transition the pair of straps from the first unlocked position to the second locked position.

13. The coupling system of claim 7, wherein at least one of the pair of straps includes a loop formed at a first end, the loop configured to rotatably receive at least one of the pair of pins therethrough to rotatably couple the at least one strap to the saddle.

14. The coupling system of claim 7, wherein at least one of the pair of straps includes a loop formed at a first end, the loop configured to rotatably receive at least one of the pair of pins therethrough to rotatably couple the at least one strap to the support rail.

15. The coupling system of claim 7, wherein the clamp assembly further comprises a strap connector configured to be disposed between the pair of straps and the torque tube to promote sliding of the pair of straps relative to the torque tube.

* * * * *